United States Patent [19]

Bennett, deceased et al.

[11] 3,902,379

[45] Sept. 2, 1975

[54] HIGH LOAD, QUICK-DISCONNECT LINK

[75] Inventors: Theodore C. Bennett, deceased, late of Gwynedd Valley, Pa., by Frances Bennett, executrix; John T. Lesniewski, Levittown; James V. Manis, Oreland, both of Pa.

[73] Assignee: The United States of America as represented by the Secretary of the Navy, Washington, D.C.

[22] Filed: Dec. 3, 1973

[21] Appl. No.: 420,836

[52] U.S. Cl.......... 74/480 R; 244/83 R; 294/83 AA
[51] Int. Cl.²........................................ B64C 13/12
[58] Field of Search............... 244/84, 83 R; 85/5 B; 294/83 AA; 74/480 R, 529

[56] References Cited
UNITED STATES PATENTS

| 1,817,204 | 8/1931 | Petersen | 244/84 |
| 2,139,193 | 12/1938 | Lamothe et al. | 294/83 AA |
| 3,469,871 | 9/1969 | Betts | 85/5 B |
| 3,477,333 | 11/1969 | Boyd et al. | 85/5 B |

FOREIGN PATENTS OR APPLICATIONS

| 520,708 | 6/1921 | France | 244/84 |
| 979,155 | 7/1955 | France | 294/83 AA |
| 217,304 | 6/1924 | United Kingdom | 244/84 |

*Primary Examiner*—Trygve M. Blix
*Assistant Examiner*—Galen L. Barefoot
*Attorney, Agent, or Firm*—R. S. Sciascia; Henry Hansen

[57] ABSTRACT

A disconnectable link for a mechanical control system such as an aircraft flight control system enabling remote decoupling and engagement of secondary flight controls from primary controls at a primary control station during emergency conditions. An electrically or fluid activated rod is moved longitudinally against the force of a spring, and a cam mounted on the rod disengages detent balls linking a sleeve member to an extension member.

1 Claim, 5 Drawing Figures

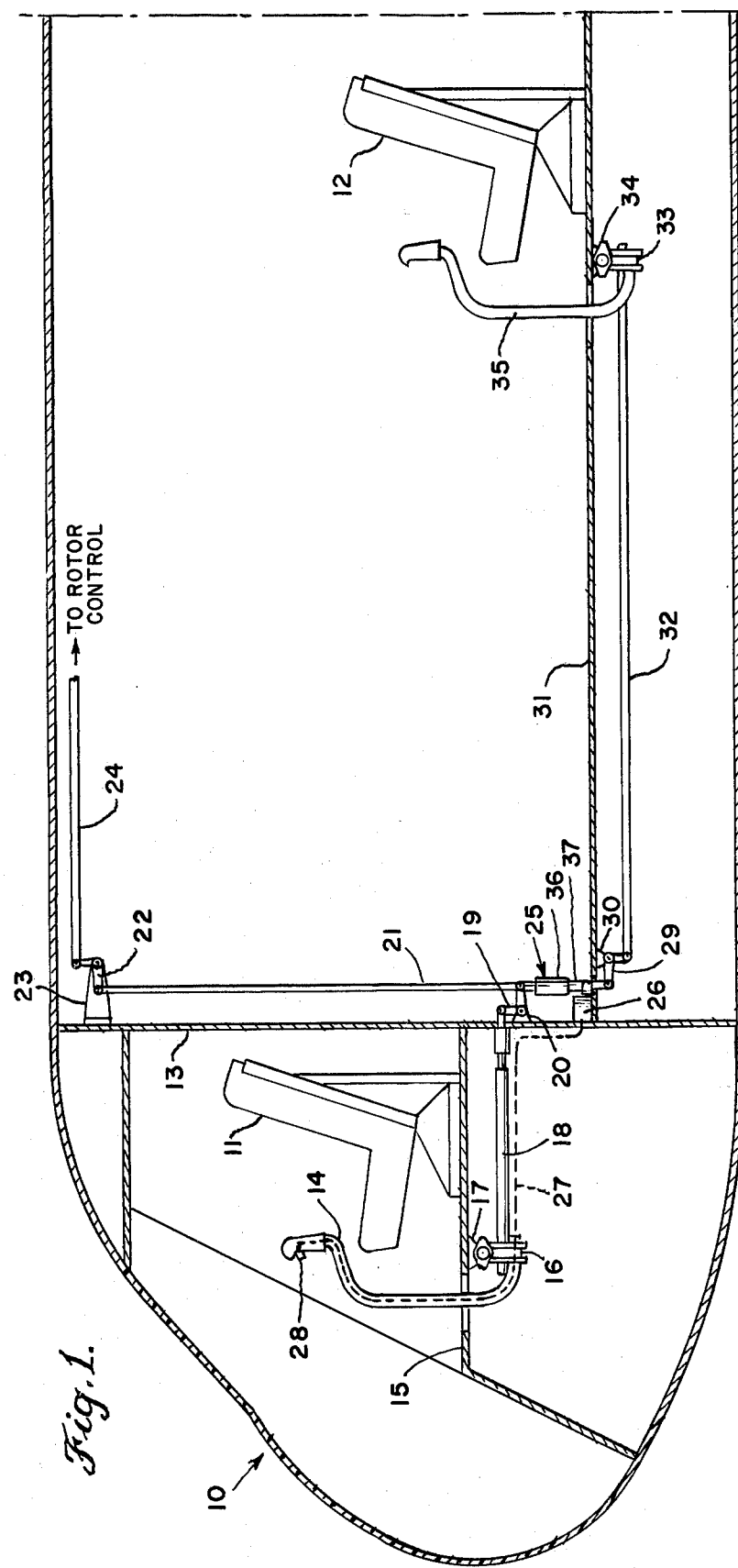
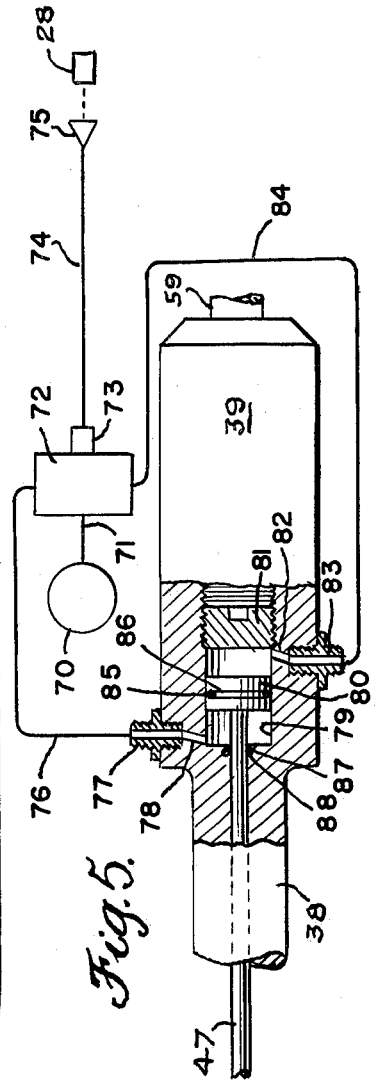

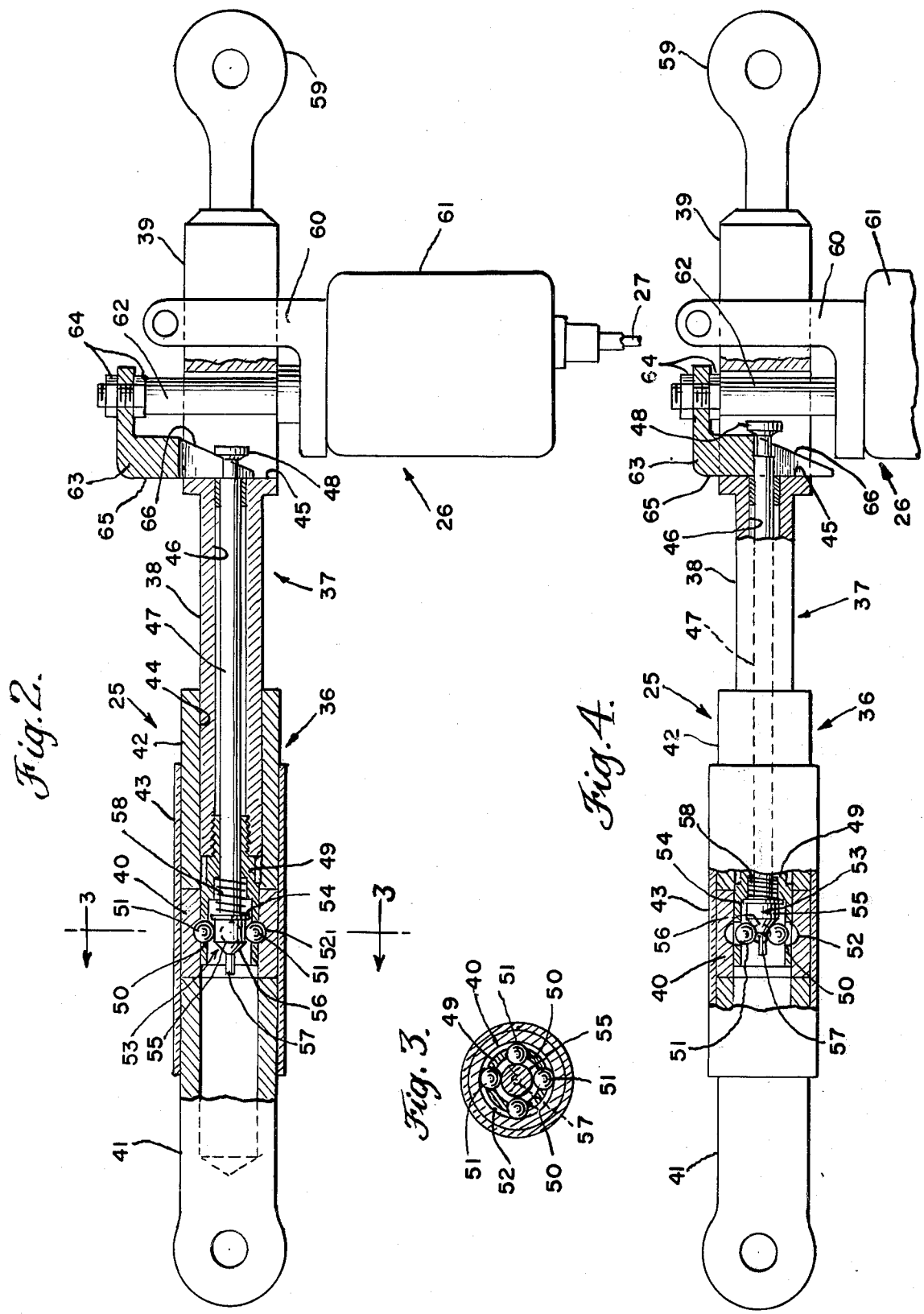

HIGH LOAD, QUICK-DISCONNECT LINK

STATEMENT OF GOVERNMENT INTEREST

The invention described herein may be manufactured and used by or for the Government of the United States of America for governmental purposes without the payment of any royalties thereof or therefor.

BACKGROUND OF THE INVENTION

This invention relates generally to the field of aeronautics and more particularly to disconnectable dual aircraft controls.

In training aircraft, both fixed wing and rotary, it is essential that the instructor have total discretionary ability to disconnect a student's control stick during emergencies or when the student "freezes" or fouls the stick. The disconnect mechanism must be reliable and easy to operate from the instructor's seat. When an instructor's seat is physically separated from the student's seat by large distances, such as in some helicopter configurations, it is further necessary that the linkage be reengageable automatically and remotely from the instructor's seat. Under certain extreme conditions a student "freezes" holding tightly onto the stick creating high tensile or compressive loads at the disconnect link. Under this condition it is essential that the link be disconnectable under high load.

SUMMARY OF THE INVENTION

Accordingly, it is a general purpose and object of the present invention to provide a simple, reliable aircraft control linkage system which is capable of being disconnected and reconnected at an instructor's station. It is another object to provide a simple, reliable link capable of being disconnected and reconnected from a remote station. It is yet a further object to provide a simple link capable of being reliably disconnected and reconnected under high loads from a remote station.

These and other objects are accomplished according to the present invention by an aircraft flight control system comprising first and second aircraft control means connected by linkage means capable of being selectively disconnected and reconnected, and actuation means at said first control means for remotely disconnecting and reconnecting said linkage means.

BRIEF DESCRIPTION OF THE DRAWINGS

FIG. 1 is a side elevational view of a flight control system in a helicopter shown in cross-section;

FIG. 2 is a side elevational view partially in cross-section of the disconnect link of FIG. 1 shown in a connected position;

FIG. 3 is a cross-sectional view taken along line 3—3 of FIG. 2;

FIG. 4 is a side elevational view partially in cross-section of the disconnect link of FIG. 1 shown in a disconnected position; and FIG. 5 is a side elevational view partially in cross-section and cutaway of the actuation portion of the link of FIG. 2 with a schematic representation of an alternate hydraulic actuation system.

DESCRIPTION OF THE PREFERRED EMBODIMENT

Referring to FIG. 1, a portion of a helicopter 10 is shown having a primary control seat 11 in the forward cockpit area and a secondary control seat 12 in the aft portion of helicopter 10 physically separated from seat 11 by a considerable amount of distance. An instructor typically occupire seat 11, while a student, or a co-pilot in some instances, typically occupies seat 12. In the present embodiment the operator in seat 12 has no visual contact with the ambient environment or with the operator in seat 11 because of the presence of a barrier 13 behind seat 11. Communication between occupants in seats 11 and 12 is therefore conducted by radio. A control stick 14 is positioned in front of seat 11 and extends downward through a floor 15 to a bracket 16 rotatable in an axial direction and connected to floor 15 by a fixed bracket 17. A transfer rod 18 is connected at one end thereof to bracket 16, and at the other end thereof through barrier 13 to one end of a bell crank 19, pivotally mounted intermediate the ends thereof to a bracket 20 fixed to barrier 13. Rod 18 transfers the axial fore and aft motion of stick 14 through crank 19 to a connecting rod 21 pivotally mounted at one end thereof to the other end of crank 19, and at the other end thereof to one end of a bell crank 22 pivotally mounted intermediate the ends thereof to a bracket 23 fixed to barrier 13. The other end of crank 22 is pivotally attached to a connecting rod 24 which is attached to the main rotor (not shown) for controlling cyclic fore and aft pitch of helicopter 10. The other end of crank 19 is pivotally connected to one end of a disconnect link 25 operated by a solenoid assembly 26 connected by a cable 27 to an acutation button 28 on stick 14. When the operator or instructor in seat 11 depresses button 28, solenoid 26 is actuated disconnecting link 25, the operation of which will be more fully described hereinafter. It is to be understood that the linkage system shown in FIG. 1 is but one of four independent control linkage system necessary to operate helicopter 10, which systems are not shown in order to simplify description of the quick disconnect link. Each of these independent control linkage systems have a disconnect link identical to link 25 and are each actuated by depressing button 28 on stick 14. These additional control linkage systems (not shown) include a cyclic lateral roll control operable from stick 14, a collective control stick for increasing and decreasing altitide, and a directional control operable from the rudder pedals.

The other end of link 25 is pivotally connected to one end of a bell crank 29 pivotally attached to a bracket 30 mounted to a section of floor 31 aft of barrier 31. A connecting rod 32 is pivotally attached at one end thereof to the other end of crank 29, and at the other end thereof to a bracket 33, similar to bracket 16, rotatable in an axial direction, and connected to floor 31 by a fixed bracket 34. A control stick 35 is positioned in front of seat 12 and extends downward through floor 31 to bracket 33. Fore and aft motion of stick 35 is transferred through bracket 33, rod 32 and link 25 to rods 21 and 24 which control hilicopeter flight as aforementioned. By disconnecting link 25, stick 35 is completely disengaged from helicopter control.

Link 25 and solenoid assembly 26 will now be described in greater detail with reference to FIGS. 2 and 4, which respectively show link 25 in the connected and separated positions. Link 25 consists of a cylinder end 36 and a piston end 37 comprising a stepped tube having a small diameter 38 and a large diameter 39. Cylinder end 36 comprises a hard steel, grooved insert 40 positioned between a rod end 41 suitable for pivotal connection, and an extension tube 42, and rigidly secured in place by a preshrunk 43 encompassing the outside diameters of insert 40, rod end 41 and tube 42. Tube 42 has an inside diameter forming a passageway 44 which accepts diameter 38 of piston end 37 and is configured to slide thereover in a telescoping manner. Diameter 39 has a rectangular, diametral cutout 45 therethrough adjacent diameter 38, and a connector 59 suitable for pivotal connection attached in some convenient manner such as by scewing to the end thereof. Diameter 38 has an axial, cylindrical passageway 46, threaded at the end adjacent cutout 45 to accept a relay rod 47 having a tapered shoulder 48 threaded onto the end thereof and extending into cutout 45. Threaded into the outer end of diameter 38 is a cylindrical steel cage 49 which fits within internal diameter of insert 40. Cage 49 contains four circular holes 50 equally spaced around the circumference thereof and formed to accept four spherical, hard steel balls 51. Balls 51 are designed to pass freely through holes 50. Insert 40 has a semicircular groove 52 around the inside diameter thereof formed to accept balls 51 therein. A cam 53, having a shoulder 54, a large diameter 55 adjacent shoulder 54, a ramp 56 adjacent diameter 55, and a small diameter 57 ramp 56 is screwed onto the other end of relay rod 47, shoulder 54 being closest to rod 47. Cam 53 is disposed axially within cage 49 in such a manner that in the connected position of link 25 shown in FIG. 2, balls 51 rest on diameter 55 and extend through holes 50 and into groove 52 of insert 40. FIG. 3 shows a cross-section of the locking portion of link 25 wherein balls 51 are resting on diameter 55 and extend through holes 50 into groove 52 of insert 40.

Referring again to FIGS. 2 and 4, a spring is disposed around rod 47 between shoulder 54 of cam 53 and a raised surface of cage 49. In the fully extended position of spring 58, shoulder 54 is disposed adjacent the respective inside edges of holes 50, causing balls 51 to lock cylinder end 36 to piston end 37, as shown in FIGS. 2 and 3.

Solenoid assembly 26 is mounted to diameter 39 by bracket 60 and comprises a solenoid actuator 61 having a actuation rod 62 extending therefrom through cutout 45 in diameter 39. A forked wedge 63 is fastened at one end thereof to rod 62 by a pair of adjustable nuts 64. The other end of wedge 63 extends downward through cutout 45, and has a flat surface 65 in contact with one wall of cutout 45, and a tapered surface 66 straddling rod 47 and contacting the tapered portion of shoulder 48.

Link 25 is shown in FIG. 2 in the connected position, corresponding to the condition wherein the control sticks 14 and 35 are interconnected in FIG. 1. In order to disconnect stick 35 from stick 14, it is necessary for the operator in seat 11 to press button 28 on stick 14 energizing solenoid actuator 61 through cable 27, and causing rod 62 to move in a downward direction forcing tapered surface 66 of wedge 63 to contact shoulder 48 at increasingly thicker portions of wedge 63. Rod 47 moves in an axial direction toward connector 59, compressing spring 58 and moving diameter 57 of cam 53 to a position directly under holes 50. Balls 51 then rest on diameter 57 disengaging them from contact with groove 52 in insert 40 and allowing piston end 37 to slide out of locking engagement with insert 40 in cylinder end 36. Maximum stroke of solenoid actuator 61 is limited to 0.4 inches in order to limit the axial excursion of rod 47 and contain balls within cage 49. In this position, control of helicopter 10 from stick 35 is not possible because motion from stick 35 has effectively been disconnected from rods 21 and 24 by link 25.

FIG. 4 shows link 25 disengaged with wedge 63 fully downward compressing spring 58, and balls 51 resting on diameter 57 disengaged from groove 52 in insert 40. When the primary operator in seat 11 determines that it is safe to reconnect the linkage to allow further control by the operator in seat 12, he merely deactuates solenoid actuator 61 by depressing button 28 on stick 14, causing rod 62 and wedge 63 to move upward and rod 47 to move away from connector 59. Spring 58 returns rod 47 to the original locked position wherein diameter 55 on cam 53 is directly under holes 50, forcing balls 51 through holes 50 and into groove 52 in insert 40. It can be seen that balls 51 easily ride down or up ramp 56 on cam 53 for easy disconnection and reconnection even under high loads.

Referring now to FIG. 5, an alternate means of stroking rod 47 by a pneumatic or hydraulic system is shown. A fluid pressure source 70 is connected by a line 71 to a four-way directional control valve 72 operated by a solenoid actuator 73 connected by a cable 74 to a remote switch 75 capable of being mounted on control stick 14 of FIG. 1. Valve 72 is connected by a hydraulic line 76 to a port 77 mounted on diameter 39 of FIGS. 2 and 4. Port 77 is connected by a passageway 78 to one end of a cavity forming a cylinder 79 is formed in diameter 39 having a piston 80 connected to rod 47, which is free to travel in an axial direction therein. Cylinder 79 is closed at the other end thereof by a plug 81, and is connected by a passageway 82 to a port 83 mounted on diameter 39, said port being connected to another outlet of valve 72 by a hydraulic line 84. An O-ring 85 mounted in a groove 86 prevents fluid from leaking past piston 80, and an O-ring 87 mounted in groove 88 in diameter 38 around rod 47 prevents fluid from leaking out cylinder 79 past rod 47.

Actuation of rod 47 separating link 25 is effectuated by introducing pressurized fluid from solenoid operated valve 72 through hydraulic line 76 to port 77 and into cylinder 79, forcing piston 80 toward plug 81, and causing cam 53 (shown in FIG. 2) to move to a position in which diameter 57 is directly under holes 50, as more fully described hereinbefore. Simultaneously, fluid is displaced from the plug end of cylinder 79 through port 83 and hydraulic line 84 to valve 72.

To reconnect link 25 solenoid operated valve 72 is shifted by deactuating switch 75, causing pressurized fluid to flow from valve 72 to port 83 and simultaneously from port 77 to valve 72. Piston 80 is thereby shifted away from plug 81 causing diameter 55 on cam 53 to be positioned under holes 50 and forcing balls 51 therethrough reconnecting link 25, as more fully described hereinbefore.

Having thus described the present invention, some of the many advantages thereof should now be readily apparent. The novel preferred embodiment system affords a relatively simple, reliable and positive disconnecting and reconnecting linkage for disengaging a secondary aircraft control stick from a primary aircraft control stick at a primary aircraft control station. The system affords maximum safety to the pilot and crew of a helicopter or other type of aircraft by allowing an operator located in a forward or primary position to assume sole control of the helicopter in time of emer- gency or under adverse flight conditions. The disconnect link provides an additional safety factor in that it is designed to operate under high loads, such as when a secondary operator or student "freezes," rigidly holding the secondary control stick.

Obviously, many modifications and variations of the present invention are possible in light of the above teachings. It is therefore to be understood that within the scope of the appended claims the invention may be practiced otherwise than as specifically described.

What is claimed is:

1. An override control system comprising:

primary control means;

secondary control means remotely disposed from said primary control means;

linkage means interposed between said primary and secondary control means, said linkage means including a separation means adapted to be connected thereto for selective disengagement and engagement of said secondary control means for said primary control means at said primary control means, said linkage means further including rod means operatively connected between said primary control means; and said separation means;

said separation means including a first elongated member connected at one end to said rod means, a second elongated member slidably inserted at one end in the other end of said first member and connected at the other end to said secondary control means, a pin slidably inserted in said second member along the length thereof and forming first cam means at one end thereof within said first member, actuator means drivingly connected to the other end of said pin, and detent means operatively connected between said first member and said first means for selectively locking the first and second members;

bias means operatively disposed between said pin and said second member for urging said first and second members to a locked position; and said actuator means including second cam means registering with said pin for sliding said pin along its length, solenoid means drivingly connected to said second cam means, and switch means positioned at said primary control means and electrically connected to said solenoid means.

* * * * *